United States Patent
Richardson

(10) Patent No.: US 8,284,929 B2
(45) Date of Patent: Oct. 9, 2012

(54) SYSTEM OF DEPENDANT KEYS ACROSS MULTIPLE PIECES OF RELATED SCRAMBLED INFORMATION

(75) Inventor: Ric B. Richardson, Irvine, CA (US)

(73) Assignee: Uniloc Luxembourg S.A., Luxembourg (LU)

( * ) Notice: Subject to any disclaimer, the term of this patent is extended or adjusted under 35 U.S.C. 154(b) by 1699 days.

(21) Appl. No.: 11/532,080

(22) Filed: Sep. 14, 2006

(65) Prior Publication Data
US 2010/0296653 A1    Nov. 25, 2010

(51) Int. Cl.
*H04L 29/06* (2006.01)
(52) U.S. Cl. .......................... 380/28; 380/278
(58) Field of Classification Search ................. 713/171, 713/172; 380/28, 33, 37, 42, 43, 268, 278, 380/283
See application file for complete search history.

(56) References Cited

U.S. PATENT DOCUMENTS

| | | |
|---|---|---|
| 4,351,982 A | 9/1982 | Miller et al. |
| 4,658,093 A | 4/1987 | Hellman |
| 4,704,610 A | 11/1987 | Smith et al. |
| 4,796,220 A | 1/1989 | Wolfe |
| 5,210,795 A | 5/1993 | Lipner et al. |
| 5,291,598 A | 3/1994 | Grundy |
| 5,386,468 A | 1/1995 | Akiyama et al. |
| 5,414,269 A | 5/1995 | Takahashi |
| 5,418,854 A | 5/1995 | Kaufman et al. |
| 5,440,635 A | 8/1995 | Bellovin et al. |
| 5,490,216 A | 2/1996 | Richardson, III |
| 5,666,415 A | 9/1997 | Kaufman |
| 5,745,879 A | 4/1998 | Wyman |
| 5,754,763 A | 5/1998 | Bereiter |
| 5,790,664 A | 8/1998 | Coley et al. |
| 5,925,127 A | 7/1999 | Ahmad |
| 5,974,150 A | 10/1999 | Kaish et al. |
| 6,009,401 A | 12/1999 | Horstmann |
| 6,044,471 A | 3/2000 | Colvin |
| 6,158,005 A | 12/2000 | Bharathan et al. |
| 6,230,199 B1 | 5/2001 | Revashetti et al. |
| 6,233,567 B1 | 5/2001 | Cohen |

(Continued)

FOREIGN PATENT DOCUMENTS

AU             678985        6/1997

(Continued)

OTHER PUBLICATIONS

Machine Translation of World Intellectual Property Organization Publication No. WO 2004/086672 A1.*

(Continued)

*Primary Examiner* — Eleni Shiferaw
*Assistant Examiner* — Hilary Branske
(74) *Attorney, Agent, or Firm* — Sean D. Burdick

(57) ABSTRACT

A method encoded on a data storage medium as executable software for processing data includes steps for providing a scrambling key for scrambling a current piece of information from a plurality of pieces of information, providing with the current piece of information a current identification token from a series of identification tokens, the current identification token to be combined with the scrambling key for scrambling a subsequent piece of information from the plurality of pieces of information, and scrambling the current piece of information using a combination of the scrambling key and a previous identification token from the series of identification tokens to create scrambled current data. A system and an article of manufacture for processing data are also disclosed.

16 Claims, 4 Drawing Sheets

U.S. PATENT DOCUMENTS

| | | | |
|---|---|---|---|
| 6,243,468 B1 | 6/2001 | Pearce et al. | |
| 6,243,469 B1 * | 6/2001 | Kataoka et al. | 380/255 |
| 6,294,793 B1 | 9/2001 | Brunfeld et al. | |
| 6,330,670 B1 | 12/2001 | England et al. | |
| 6,449,645 B1 | 9/2002 | Nash | |
| 6,536,005 B1 | 3/2003 | Augarten | |
| 6,785,825 B2 | 8/2004 | Colvin | |
| 6,804,257 B1 * | 10/2004 | Benayoun et al. | 370/471 |
| 6,859,793 B1 | 2/2005 | Lambiase | |
| 6,920,567 B1 | 7/2005 | Doherty et al. | |
| 6,961,858 B2 | 11/2005 | Fransdork | |
| 6,976,009 B2 | 12/2005 | Tadayon et al. | |
| 7,032,110 B1 | 4/2006 | Su et al. | |
| 7,069,440 B2 | 6/2006 | Aull | |
| 7,069,595 B2 | 6/2006 | Cogmigni et al. | |
| 7,085,741 B2 | 8/2006 | Lao et al. | |
| 7,107,462 B2 | 9/2006 | Fransdork | |
| 7,188,241 B2 | 3/2007 | Cronce et al. | |
| 7,203,966 B2 | 4/2007 | Abburi et al. | |
| 7,206,765 B2 | 4/2007 | Gilliam et al. | |
| 7,272,728 B2 | 9/2007 | Pierson et al. | |
| 7,319,987 B1 | 1/2008 | Hoffman et al. | |
| 7,327,280 B2 | 2/2008 | Bachelder et al. | |
| 7,337,147 B2 | 2/2008 | Chen et al. | |
| 7,343,297 B2 | 3/2008 | Bergler et al. | |
| 7,463,945 B2 | 12/2008 | Kiesel et al. | |
| 7,653,899 B1 | 1/2010 | Lindahl et al. | |
| 2001/0034712 A1 | 10/2001 | Colvin | |
| 2001/0044782 A1 | 11/2001 | Hughes et al. | |
| 2002/0019814 A1 | 2/2002 | Ganesan | |
| 2002/0082997 A1 | 6/2002 | Kobata et al. | |
| 2002/0161718 A1 | 10/2002 | Coley et al. | |
| 2003/0065918 A1 | 4/2003 | Willey | |
| 2003/0084306 A1 * | 5/2003 | Abburi et al. | 713/188 |
| 2003/0172035 A1 | 9/2003 | Cronce et al. | |
| 2004/0024860 A1 | 2/2004 | Sato et al. | |
| 2004/0030912 A1 | 2/2004 | Merkle et al. | |
| 2004/0059929 A1 | 3/2004 | Rodgers et al. | |
| 2004/0143746 A1 | 7/2004 | Ligeti et al. | |
| 2004/0187018 A1 | 9/2004 | Owen et al. | |
| 2004/0215661 A1 * | 10/2004 | Zhang et al. | 707/104.1 |
| 2005/0108173 A1 | 5/2005 | Stefik et al. | |
| 2005/0138155 A1 | 6/2005 | Lewis | |
| 2005/0166263 A1 * | 7/2005 | Nanopoulos et al. | 726/7 |
| 2005/0172280 A1 | 8/2005 | Ziegler et al. | |
| 2006/0026442 A1 * | 2/2006 | Ittogi | 713/189 |
| 2006/0072444 A1 | 4/2006 | Engle et al. | |
| 2006/0095454 A1 | 5/2006 | Shankar et al. | |
| 2006/0161914 A1 | 7/2006 | Morrison et al. | |
| 2006/0190403 A1 * | 8/2006 | Lin et al. | 705/51 |
| 2006/0233361 A1 * | 10/2006 | Hasegawa et al. | 380/42 |
| 2006/0265337 A1 | 11/2006 | Wesinger, Jr. | |
| 2006/0265758 A1 * | 11/2006 | Khandelwal et al. | 726/27 |
| 2006/0282511 A1 | 12/2006 | Takano et al. | |
| 2007/0168288 A1 | 7/2007 | Bozeman | |
| 2007/0198422 A1 | 8/2007 | Prahlad et al. | |
| 2007/0203846 A1 | 8/2007 | Kavuri et al. | |
| 2007/0219917 A1 | 9/2007 | Liu et al. | |
| 2007/0253549 A1 * | 11/2007 | Celikkan et al. | 380/42 |
| 2007/0255947 A1 * | 11/2007 | Choudhury et al. | 713/161 |
| 2007/0282615 A1 | 12/2007 | Hamilton et al. | |
| 2008/0065552 A1 | 3/2008 | Elazar et al. | |
| 2008/0183622 A1 | 7/2008 | Dixon et al. | |

FOREIGN PATENT DOCUMENTS

| | | |
|---|---|---|
| EP | 1 637 958 | 3/2006 |
| EP | 1 637 961 | 3/2006 |
| EP | 1 670 188 | 6/2006 |
| WO | WO 92/20022 | 11/1992 |
| WO | WO 93/01550 | 1/1993 |
| WO | WO 95/35533 | 12/1995 |
| WO | WO 00/67095 | 11/2000 |
| WO | WO 2004/086672 | 10/2004 |
| WO | WO-2004/086672 A1 * | 10/2004 |
| WO | WO 2005/104686 | 11/2005 |
| WO | WO 2007/060516 | 5/2007 |
| WO | WO 2008/013504 | 1/2008 |

OTHER PUBLICATIONS

Williams, "A Painless Guide to CRC Error Detection Algorithms," 33 pages, www.ross.net/crc/download/crc_v3.txt.

Wikipedia: "Software Extension," May 28, 2009, Internet Article retrieved on Oct. 11, 2010. XP002604710.

* cited by examiner

| | |
|---|---|
| 21 — A | Identification token from last piece of information |
| 22 — Z | Identification token from previous to last piece of information |
| 23 — B | Scrambling Key |
| 24 — C | Information in readable form |
| 25 — D | Scrambled information |

20

30 — Example Algorithm

31 — $(A+B)C=D$

32 — $C=D/(A+B)$

33 — $C \neq D/(Z+B)$

FIG. 2

SYSTEM OF DEPENDANT KEYS ACROSS MULTIPLE PIECES OF RELATED SCRAMBLED INFORMATION

BACKGROUND

1. Field

The present invention relates generally to security in computing environments, and more particularly, to a system of dependant keys across multiple pieces of related scrambled information.

2. Background

A common approach to scrambling information is to use a scrambling key and an algorithm to scramble the information to be protected. To descramble the information a descrambling key is used with the same or corresponding algorithm to return the information to its original readable state. A goal of encryption and scrambling techniques is to increase the complexity and effort needed to descramble or decrypt the protected information.

SUMMARY OF THE PREFERRED EMBODIMENTS

The present invention provides a method for processing (i.e., scrambling and descrambling) data. In one preferred embodiment of the present invention, the method includes the steps of providing a scrambling key for a current data to be scrambled, the current data being a piece of information that is from a plurality of pieces of information; providing an identification token of another piece of information from the plurality of pieces of information; and, scrambling the current data to be scrambled with the scrambling key and the identification token of a last piece of information to create a scrambled current data.

A system for processing data is also disclosed. The system includes a processor and a memory coupled to the processor. In one preferred embodiment, the memory is configured to cause the processor to execute a method including the steps of providing a scrambling key for a current data to be scrambled, the current data being a piece of information that is from a plurality of pieces of information; providing an identification token of another piece of information from the plurality of pieces of information; and, scrambling the current data to be scrambled with the scrambling key and the identification token of a last piece of information to create a scrambled current data.

An article of manufacture including a computer-readable medium having instructions stored thereon for causing a processor to perform a method for processing data is also disclosed. The method including the steps of providing a scrambling key for a current data to be scrambled, the current data being a piece of information that is from a plurality of pieces of information; providing an identification token of another piece of information from the plurality of pieces of information; and, scrambling the current data to be scrambled with the scrambling key and the identification token of a last piece of information to create a scrambled current data.

Other objects, features and advantages will become apparent to those skilled in the art from the following detailed description. It is to be understood, however, that the detailed description and specific examples, while indicating exemplary embodiments, are given by way of illustration and not limitation. Many changes and modifications within the scope of the following description may be made without departing from the spirit thereof, and the description should be understood to include all such variations.

BRIEF DESCRIPTION OF THE DRAWINGS

The invention may be more readily understood by referring to the accompanying drawings in which:

FIG. 2 is an exemplary process to be used for the scrambling of information configured in accordance with one preferred embodiment of the present invention; and, FIG. 3 illustrates an exemplary scrambling process of the invention configured in accordance with one preferred embodiment of the present invention.

Like numerals refer to like parts throughout the several views of the drawings.

DETAILED DESCRIPTION

The present invention is designed to complicate, and therefore make more secure, a series of cryptographic keys across a number of separate but related pieces of information that are to be scrambled.

The present invention adds to the computational power required to attack and break the scrambling algorithm, therefore making the protected information more secure.

The present invention is relatively easy to implement and therefore adds to the speed and effectiveness of the scrambling process, while simplifying the steps involved to protect the information to be protected.

The present invention gives the publisher or originator of the information a high level of control over the protected information and therefore is ideal for information distribution applications.

The present invention furthers the goal of creating more secure communication by, in one preferred embodiment, adding key components relating to the information's position in a series of separate pieces of information as part of the scrambling and descrambling process. This positional and sequential information is only known to the publisher of the information and to the recipient. These unknown factors add to the complexity of the descrambling effort needed by a third party that wishes to attack and descramble the information.

Another benefit of the present invention is that since the descrambling key for a series of pieces of information are related, it is possible to supply a descramble code for the last piece of information in the series and obtain descrambling codes for all the other pieces of code in the series without consulting the publisher for separate descrambling keys for each individual piece of information.

The present invention simplifies the descrambling process and drastically reduces the size of the keys needed to descramble the whole series of pieces of information. This reduction in the size of the descrambling key relative to the size of the information being descrambled delivers advantages in terms of communication time and speed in delivering the key to the recipient.

Figure 1:
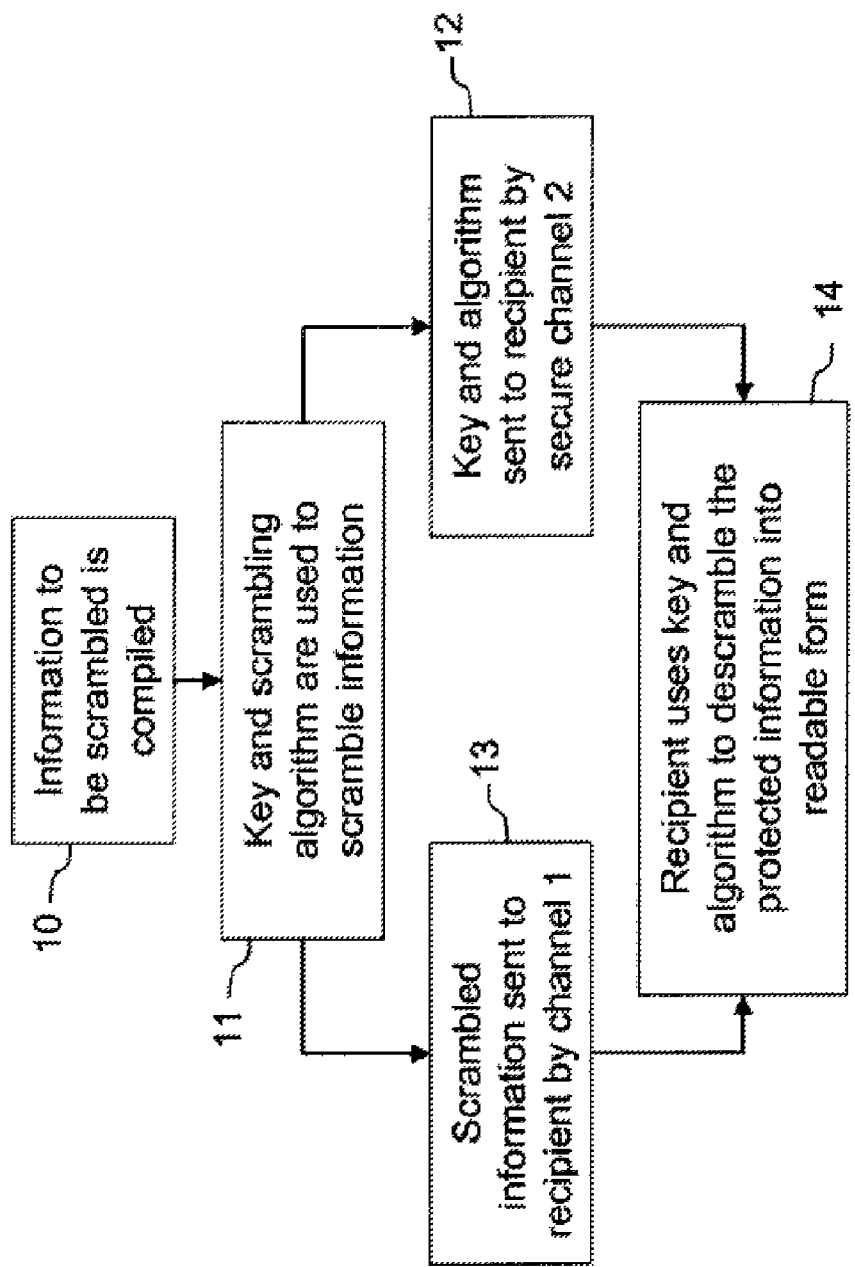
FIG. 1 is a prior art scrambling process.

FIG. 1 represents an example of a scrambling process that is used to protect information from being read by unauthorized persons. In the first step 10, the information to be scrambled is compiled by the sender. Then, in step 11, the data is scrambled using an algorithm (that is known to the sender) with a unique key that is used for this specific data transfer. Then, the key and the algorithm are sent to the recipient in step 12 and, in a separate communications channel, to the scrambled data in step 13. Upon receipt of the information, the receiver uses the scrambling key and the algorithm to descramble the protected information into a readable form in step 14.

The advantage of the method shown in FIG. 1 is that any interception of the data while it is being sent will not allow the interceptor to obtain access to the protected data, sent in step 13, without also intercepting the other secret channel that contains the algorithm and unique key, sent in step 12, both of which are needed to descramble the data in step 14.

FIG. 2 illustrates the main components in the present invention and an exemplary algorithm showing how the components interact. A component table 20 includes a set of components 21-25 used to implement an algorithm 30 configured in accordance with one preferred embodiment of the present invention. The letter "A" represents an algorithmic component 21 that represents an identification token from a piece of information that has been previously delivered to the recipient. In one preferred embodiment, this piece of information is also the last piece in a sequence of pieces of information sent to a recipient. The letter "Z" represents an algorithmic component 22 that represents an identification token from a piece of information that has been previously delivered to the recipient. This piece of information is a piece of information that was previous to the last piece in a sequence of pieces of information sent to the recipient. The letter "B" represents an algorithmic component 23 that represents a scrambling key 23 used with the scrambling algorithm 30 to scramble 31 and unscramble 32 the scrambled data 25. The letter "C" represents an algorithmic component 24 that represents the information to be scrambled in its initial unscrambled and readable form. The letter "D" represents an algorithmic component 25 that represents the information to be protected in its scrambled form after it has been processed by the use of the scrambling key 23 and the scrambling algorithm 30. The exemplary algorithm 30 described in FIG. 2 shows two simple forms of arranging the components. The first form, shown in scrambling algorithm 31, represents the use of a simple algorithm to accomplish scrambling. In this algorithm, the identification token 21 from the last piece of information sent to the recipient is added to the scrambling key 23 to be used with the current piece of data to be scrambled. These two pieces of information are used to process the initial unscrambled data 24 to produce the scrambled version 25 of the data.

The second form of the algorithm 32 represents the use of a simple algorithm to accomplish descrambling. In this algorithm, the unscrambled data 24 is produced by adding the scrambling key 23, sent from the sender to be used with the current piece of data, with the identification token 21 from the last piece of data sent to the recipient from the sender in a sequence of data. These two pieces of information are used with the scrambled version 25 of the data using a process to exactly reverse the effects of the process used to scramble the data before the data being sent. This will produce the final unscrambled version 24 of the data.

The third form of the algorithm 33 gives an example of how the algorithm will fail if components are not arranged according to the rule outlined in the first two forms of the algorithm. The algorithm shows that if the identification token from the previous to last piece of data 22 in a sequence of data is used with the scrambled version of the data 25, then the scrambled version of the data will not be successfully unscrambled. This will be true of the tokens of any of the pieces in the sequence of pieces of data except the very last piece 21 sent to the recipient.

Figure 3:
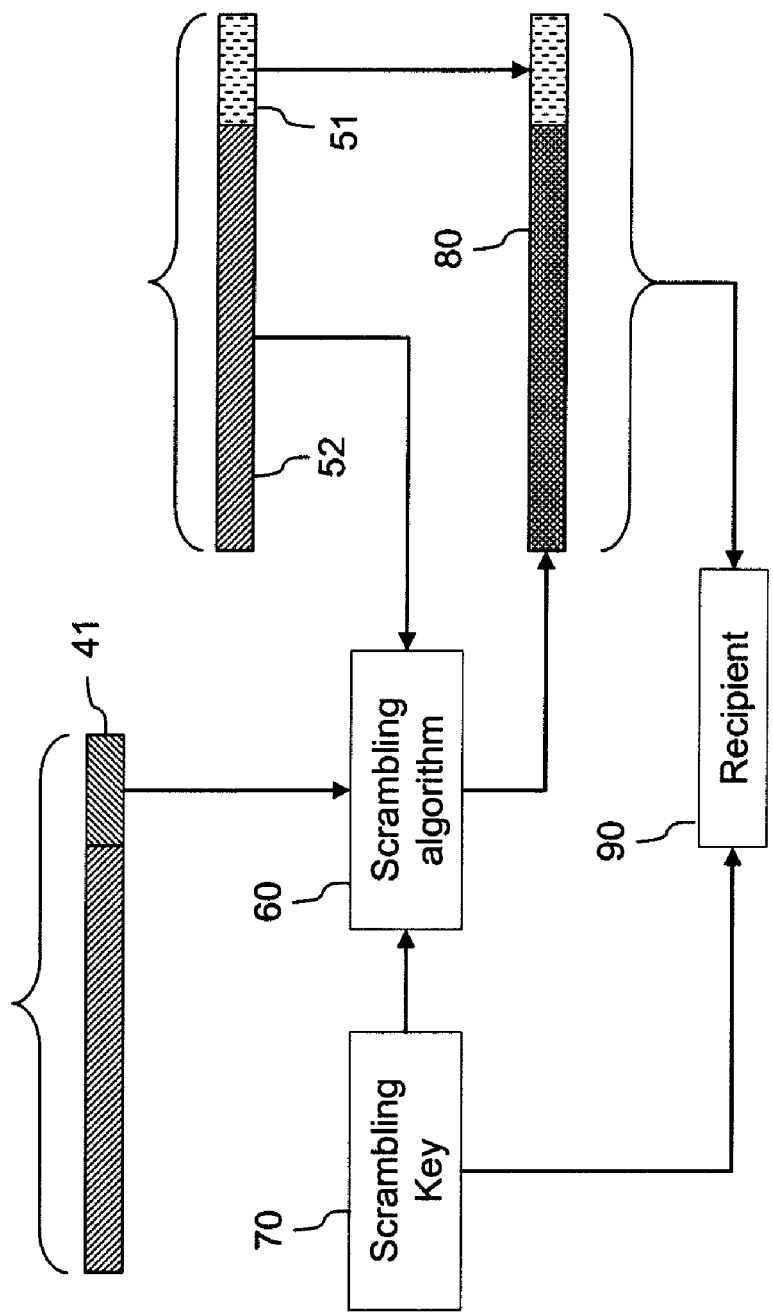

FIG. 3 illustrates how an identification token of the last piece of information 41 is used with a scrambling key 70 for a current data to be scrambled 52. These two pieces of information are used by a scrambling algorithm 60 to process the data to be scrambled 52. The result of the processing of the data is a scrambled version 80 of the same data that is sent to a recipient 90 along with an identification token 51 for that piece of data. The scrambling key 70 and the descrambling algorithm 61 are sent to the recipient 90 via separate secure communications.

Figure 4:
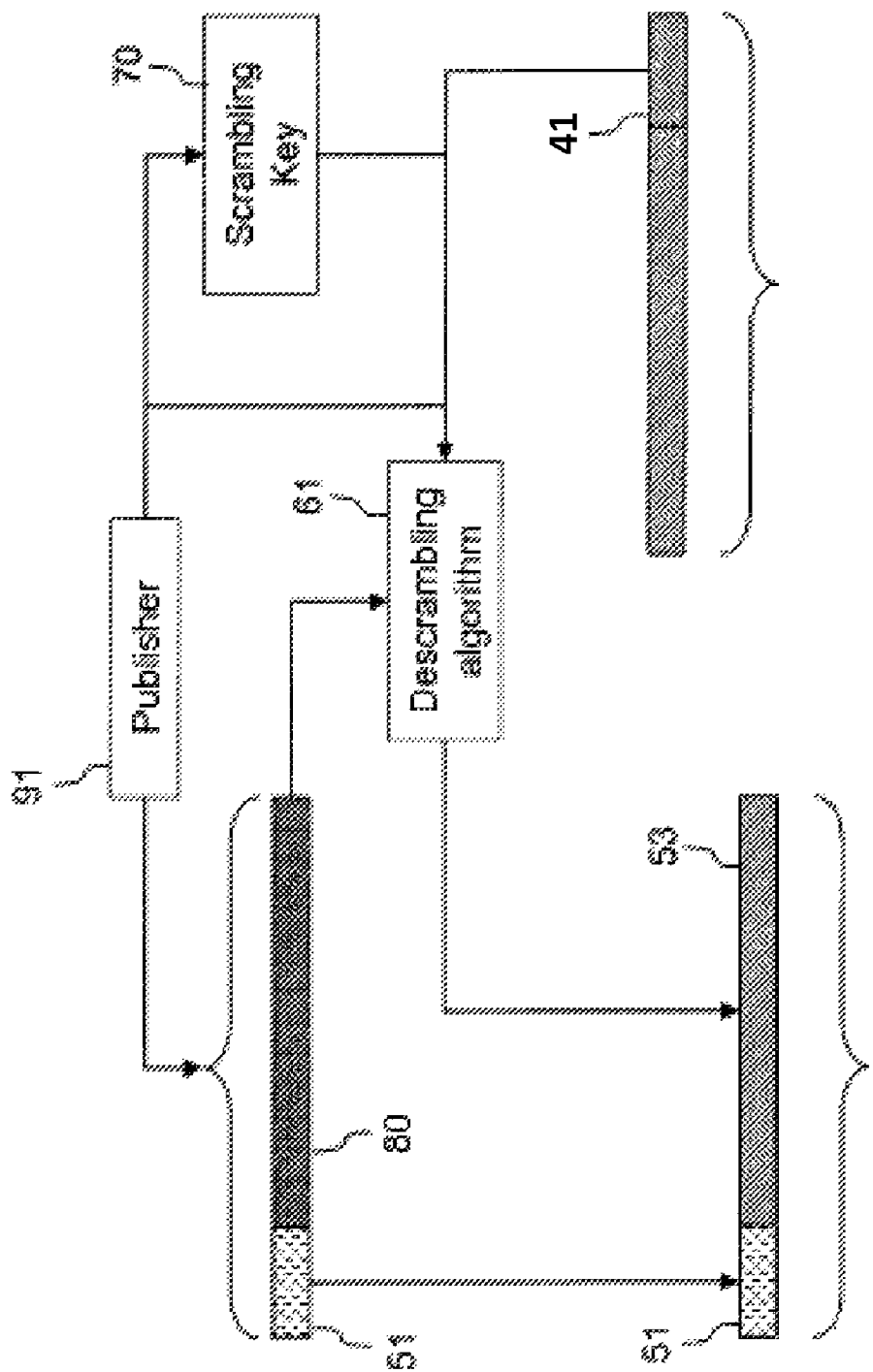
FIG. 4 illustrates an exemplary descrambling process of the invention configured in accordance with one preferred embodiment of the present invention.

FIG. 4 shows how the recipient 90 uses the information from a publisher 91, i.e., the sender, to descramble a piece of information. The recipient 90 uses the identification token from the piece of information that was last sent to them 41 in a series of pieces of information along with the scrambling key 70 sent to them from the publisher 91 using secure communications and process these against the scrambled version 80 of the data delivered to them via a separate channel by the sender. The result from the use of the descrambling algorithm 61 is a copy of the original data 53 that was scrambled in its now unscrambled form.

In one preferred embodiment of the present invention, the information to be protected 52 is initially scrambled by the publisher 91 with the algorithm 60 that uses the scrambling key 70 in combination with the unique identification token 41 from a piece of information that has already been sent in a sequence of information pieces to the recipient 90.

The scrambled version of the information 80 is sent to the recipient 90. Additionally the scrambling key 70 and the algorithm 61 are sent to the recipient 90 via a second channel of communication.

Upon receipt, the recipient 90 uses the algorithm 61 with the scrambling key 70 received from the publisher 91, in combination with the unique identification token 41 from the last piece of information that was also sent by the publisher 91, to descramble the information and return it to readable form 53.

If the unique identification token from the last piece of information sent by the publisher is not available or a token from another piece of information 22 is submitted in its place, the information will not descramble to readable form—even if the scramble key 70 was compromised during communication between the publisher and the recipient.

The above described embodiment of the invention uses the same scrambling key across multiple pieces of a sequence of pieces of information being sent to a recipient. This is advantageous in that if the recipient records the order in which the pieces of information were received it would be possible to descramble all the pieces of information received with only the scrambling key and the algorithm.

An alternative embodiment of the invention involves producing separate and different scrambling keys for each piece of information sent in the sequence of information. In this embodiment of the invention, the approach is more secure. Conversely, in this approach the feature of being able to send one descrambling key and the algorithm to descramble a whole sequence of pieces of information is lost.

In another preferred embodiment, the algorithm is modified to use information identity tokens from pieces of information that are not in contiguous sequence but are requested by the algorithm in an order expressed by a separate sequencing algorithm component.

It should be noted that the methods described herein may be implemented on a variety of communication hardware, processors and systems known by one of ordinary skill in the art. The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The embodiments described above are exemplary embodiments. Those skilled in the art may now make numerous uses of, and departures from, the above-described embodiments without departing from the inventive concepts disclosed herein. Various modifications to these embodiments may be readily apparent to those skilled in the art, and the generic principles defined herein may be applied to other embodiments, without departing from the spirit or scope of the novel aspects described herein. Thus, the scope of the invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as the most preferred or advantageous over other embodiments. Accordingly, the present invention is to be defined solely by the scope of the following claims.

What is claimed is:

1. A method encoded on a data storage medium as executable software for processing data, the method comprising steps of:
    providing a scrambling key for scrambling a current piece of information from a plurality of pieces of information;
    providing with the current piece of information a current identification token from a series of identification tokens, the current identification token to be combined with the scrambling key for scrambling a subsequent piece of information from the plurality of pieces of information;
    scrambling the current piece of information using a combination of the scrambling key and a previous identification token from the series of identification tokens to create scrambled current data; and
    combining the scrambled current data with the current identification token prior to transmission;
    the steps performed by a processor executing the software.

2. The method of claim 1 further comprising transmitting the scrambled current data to a recipient via a first communication channel.

3. The method of claim 2 further comprising transmitting the scrambling key and a descrambling algorithm to the recipient via a second communication channel that is separate from the first communication channel.

4. The method of claim 1 further comprising, subsequent to the scrambling step, scrambling a next piece of information from the plurality of pieces of information using a combination of the scrambling key and the current identification token.

5. A system for processing data comprising:
    a processor;
    a memory coupled to the processor, the memory configured to cause the processor to execute a method comprising:
        providing a scrambling key for scrambling a current piece of information from a plurality of pieces of information;
        providing with the current piece of information a current identification token from a series of identification tokens, the current identification token to be combined with the scrambling key to scramble a subsequent piece of information from the plurality of pieces of information; and
        scrambling the current piece of information using a combination of the scrambling key and a previous identification token from the series of identification tokens to create scrambled current data; and
        combining the scrambled current data with the identification token prior to transmission.

6. The system of claim 5, wherein the method executed by the processor further comprises transmitting the scrambled current data to a recipient via a first communication channel.

7. The system of claim 6, wherein the method executed by the processor further comprises transmitting the scrambling key and a descrambling algorithm to the recipient via a second communication channel that is separate from the first communication channel.

8. The system of claim 5 wherein the memory is further configured to cause the processor to execute, subsequent to the scrambling step, a step for scrambling a next piece of information from the plurality of pieces of information using a combination of the scrambling key and the current identification token.

9. An article of manufacture comprising a non-transitory computer-readable medium having instructions stored thereon for causing a processor to perform a method for processing data, the method comprising:
    providing a scrambling key for scrambling a current piece of information from a plurality of pieces of information;
    providing with the current piece of information a current identification token from a series of identification tokens, the current identification token to be combined with the scrambling key for scrambling a subsequent piece of information from the plurality of pieces of information;
    scrambling the current piece of information using a combination of the scrambling key and a previous identification token from the series of identification tokens to create scrambled current data; and
    combining the scrambled current data with the current identification token prior to transmission.

10. The article of manufacture of claim 9, wherein the method performed by the processor further comprises transmitting the scrambled current data to a recipient via a first communication channel.

11. The article of manufacture of claim 10, wherein the method executed by the processor further comprises transmitting the scrambling key and a descrambling algorithm to the recipient via a second communication channel that is separate from the first communication channel.

12. The article of claim 9 wherein the computer-readable medium includes further instructions stored thereon for causing the processor to execute, subsequent to the scrambling step, a step for scrambling a next piece of information from the plurality of pieces of information using a combination of the scrambling key and the current identification token.

13. A method encoded on a data storage medium as executable software for secure data transmission, the method comprising steps of:
dividing data to be transmitted into a plurality of pieces of information;
associating each of the pieces of information with a corresponding identification token;
scrambling the pieces of information in a sequence, in each step of the sequence a piece of information being scrambled using a scrambling algorithm to create scrambled current data, the scrambling algorithm scrambling the piece of information using (a) a scrambling key and (b) a last identification token that was input to the scrambling algorithm as a corresponding identification token in a previous step of the sequence;
combining, in each step of the sequence, the scrambled current data with the current identification token; and
transmitting data in a transmission sequence, each step of the transmission sequence following a corresponding step of the scrambling sequence, the data transmitted in each step of the transmission sequence comprising (a) the scrambled current data and current identification token combined in the corresponding scrambling step, (b) the scrambling key, and (c) a descrambling algorithm;
wherein the descrambling algorithm when executed recovers the piece of information and its corresponding identification token responsive to receiving as input (a) the scrambled current data, (b) the scrambling key, and (c) the last identification token; and
wherein the steps are performed by a computer processor executing the software.

14. The method of claim 13 wherein the combined scrambled current data and current identification token are transmitted via a first communication channel and wherein the scrambling key and the descrambling algorithm are transmitted via a second communication channel that is separate from the first communication channel.

15. The method of claim 13 wherein the dividing step comprises dividing the data to be transmitted into a plurality of pieces of information arranged in a contiguous order.

16. The method of claim 13 wherein the dividing step comprises dividing the data to be transmitted into a plurality of pieces of information arranged in a non-contiguous order.

* * * * *